(No Model.)
F. F. PARKER.
MACHINE FOR BORING HOLES IN CHAIR LEGS.
No. 250,167. Patented Nov. 29, 1881.
5 Sheets—Sheet 3.
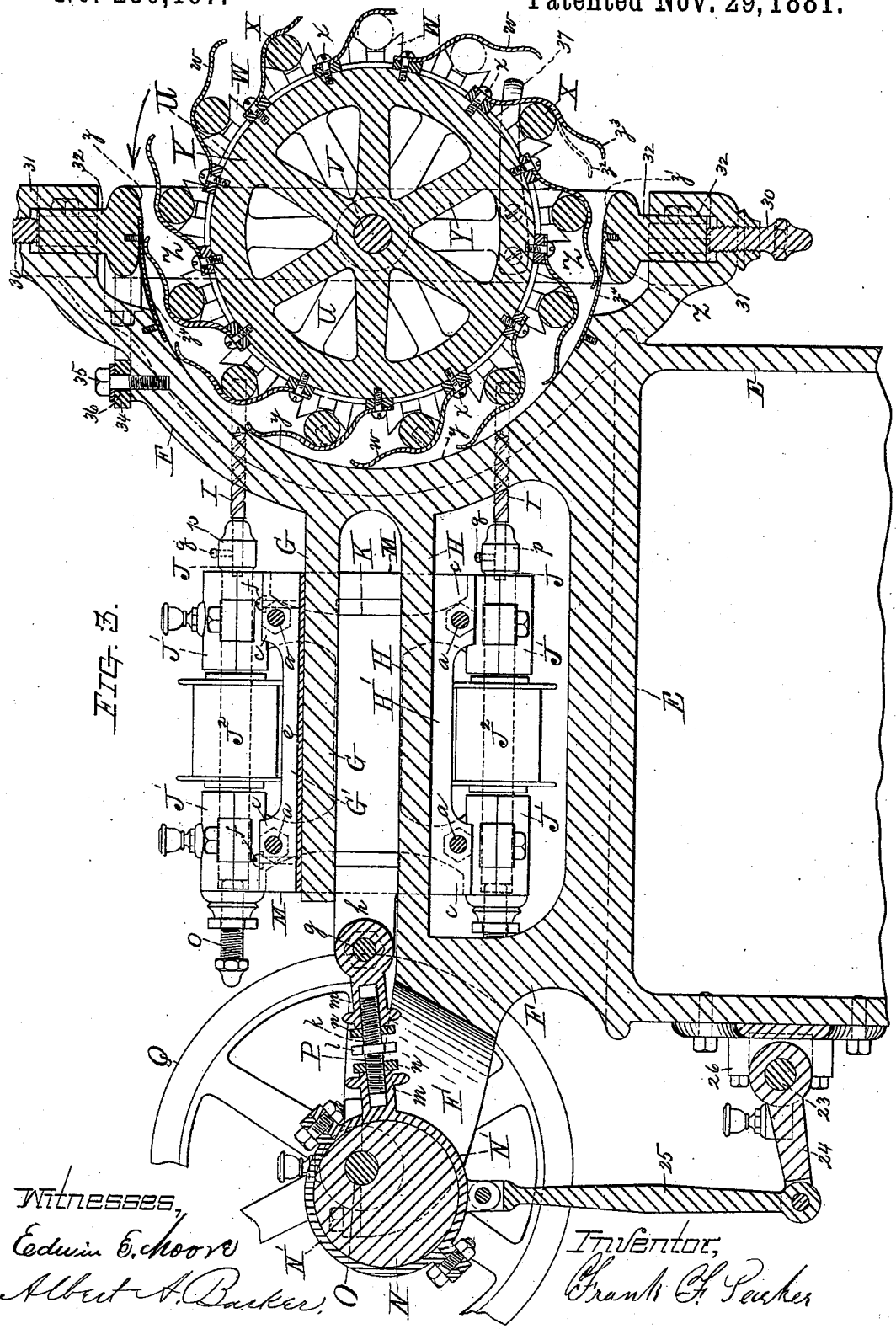

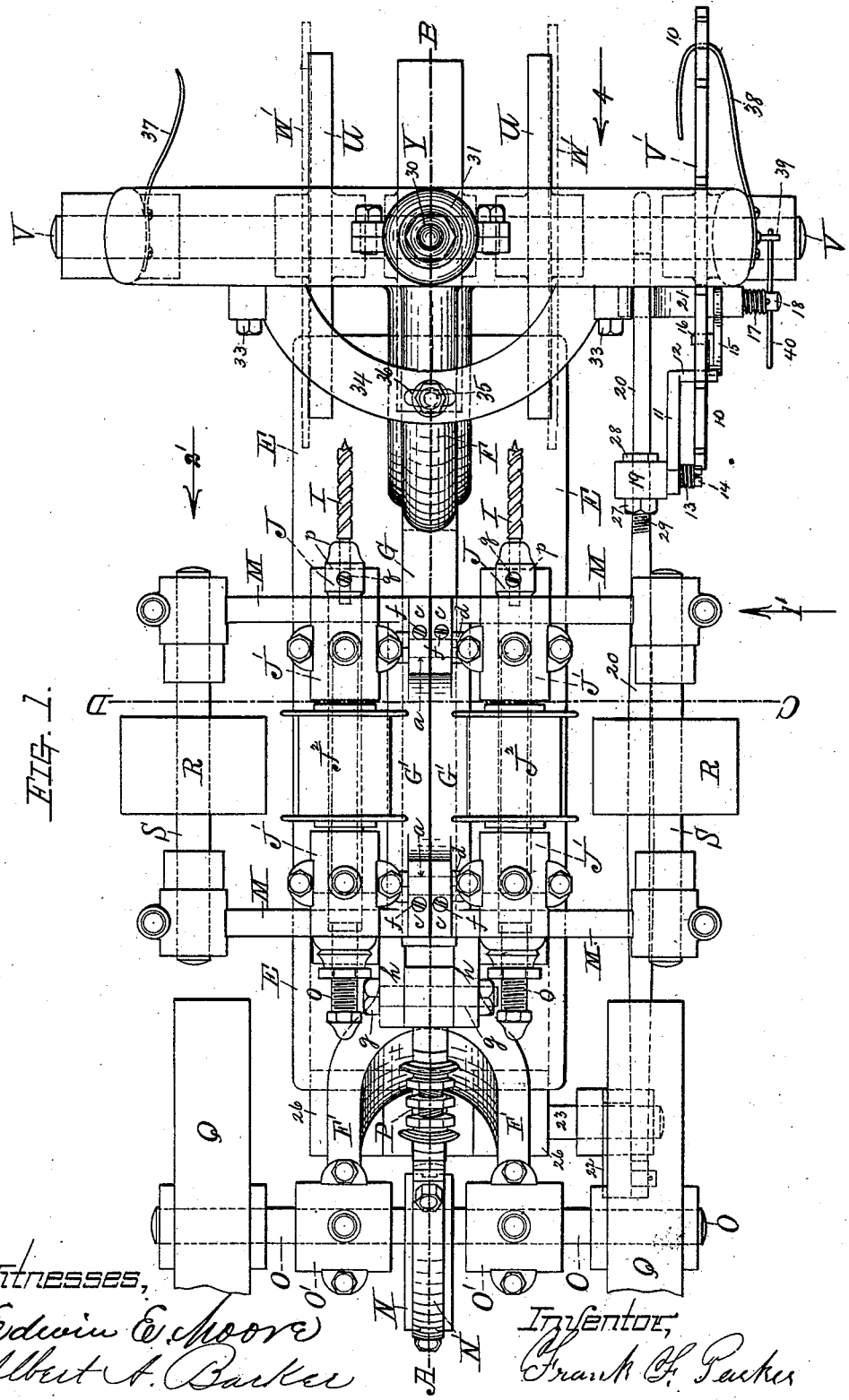

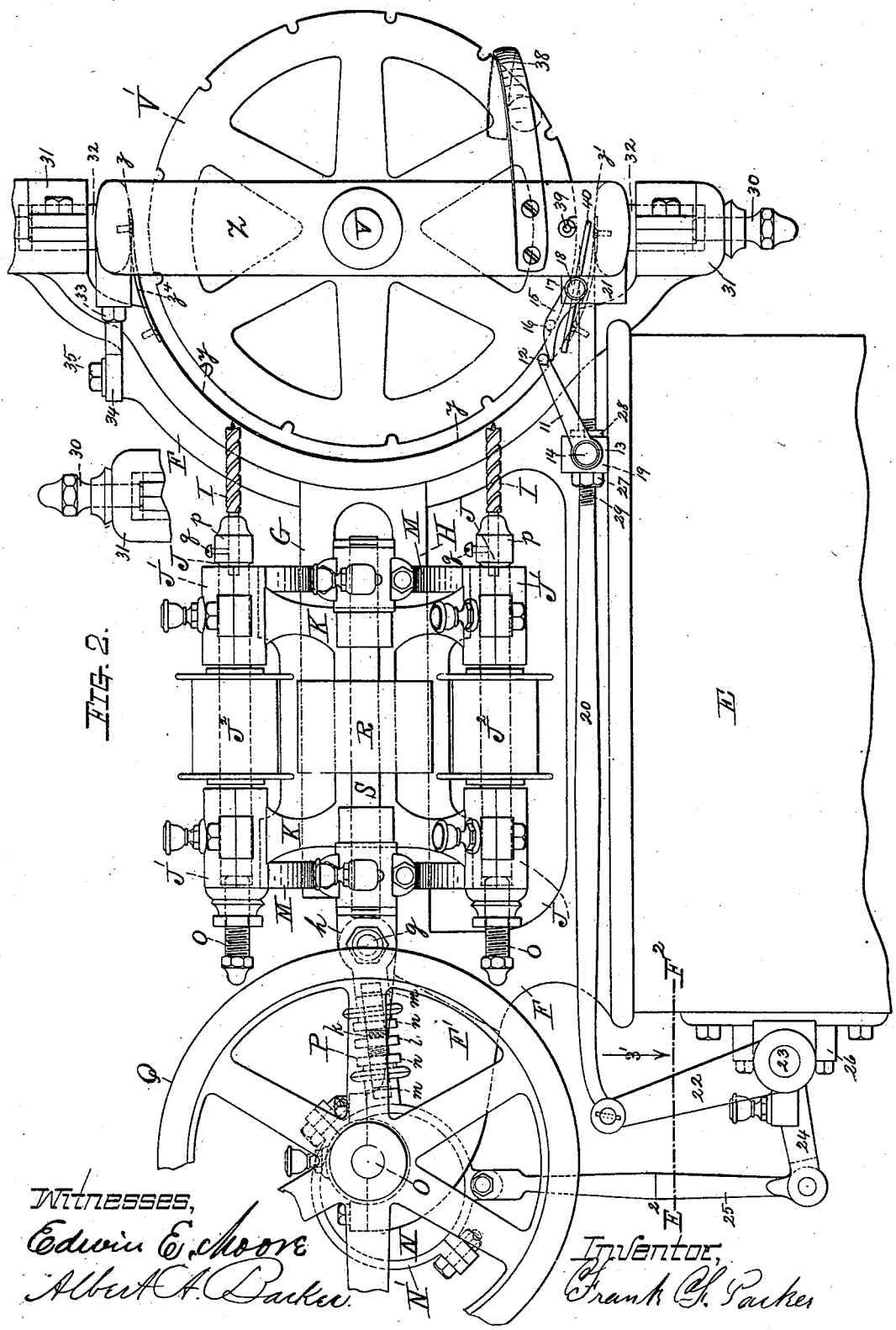

(No Model.) 5 Sheets—Sheet 4.
F. F. PARKER.
MACHINE FOR BORING HOLES IN CHAIR LEGS.
No. 250,167. Patented Nov. 29, 1881.
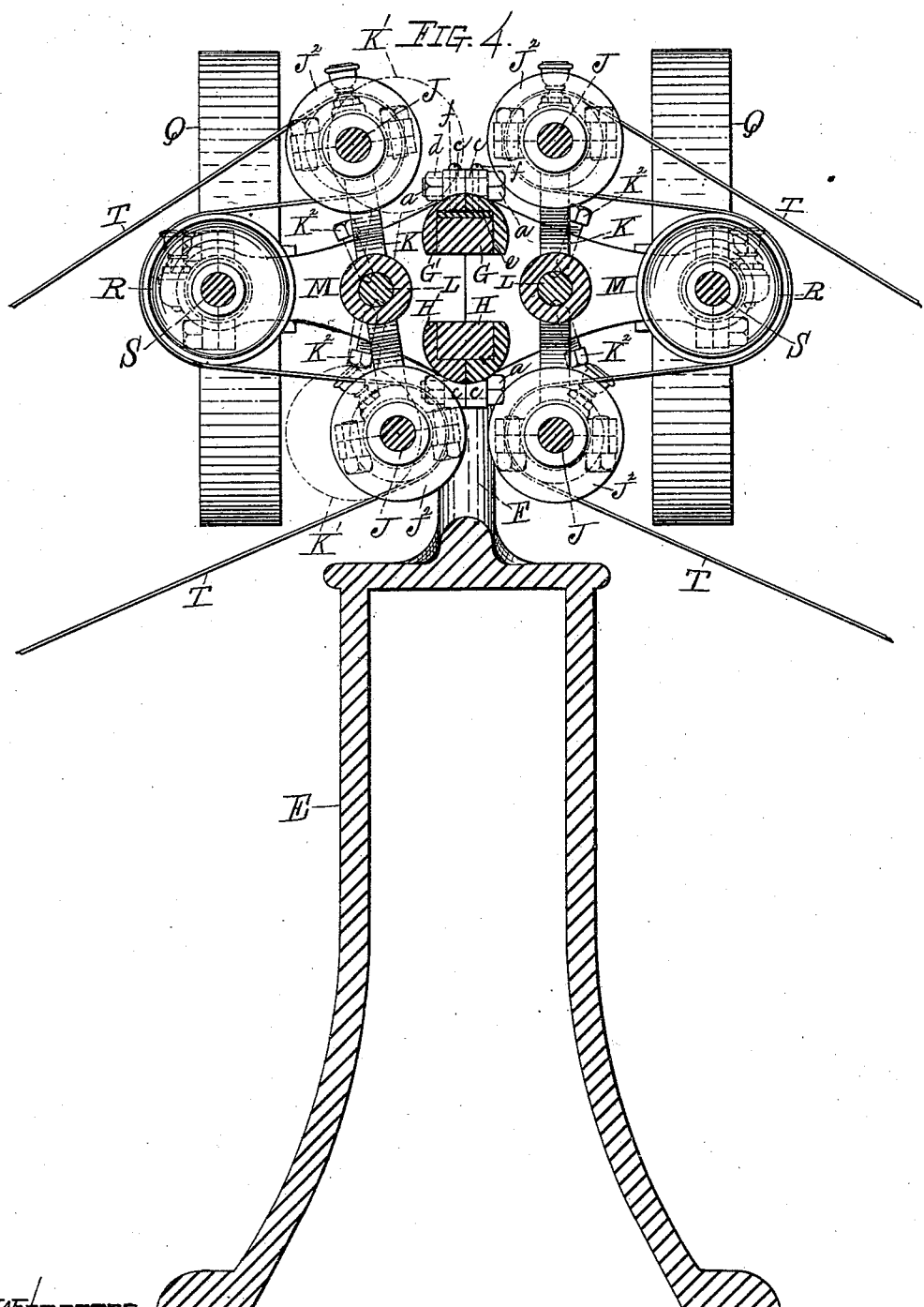

(No Model.)  5 Sheets—Sheet 5.
F. F. PARKER.
MACHINE FOR BORING HOLES IN CHAIR LEGS.
No. 250,167. Patented Nov. 29, 1881.
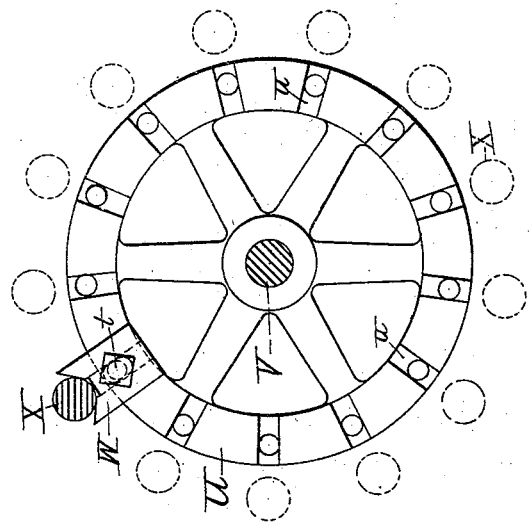
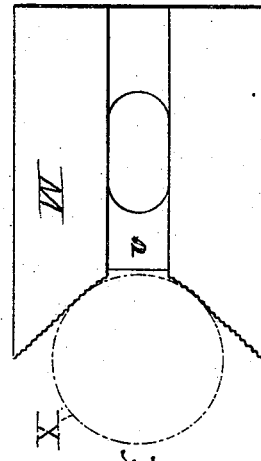
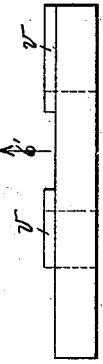
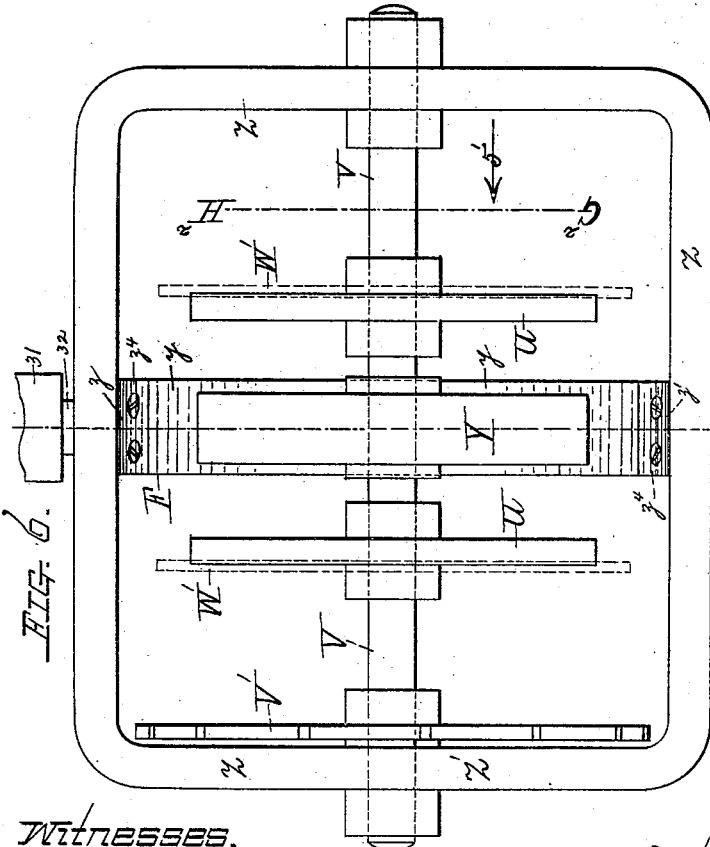
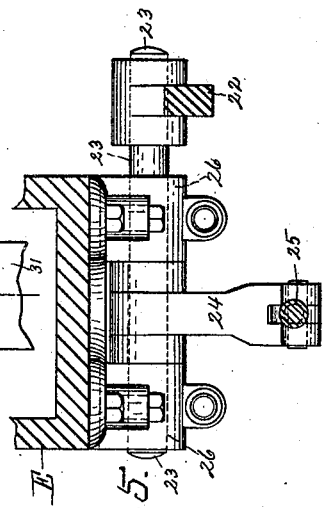
Witnesses,
Edwin E. Moore
Albert A. Parker
Inventor,
Frank F. Parker
N. PETERS, Photo-Lithographer, Washington, D. C.

UNITED STATES PATENT OFFICE.

FRANK F. PARKER, OF GARDNER, MASSACHUSETTS, ASSIGNOR TO PHILANDER DERBY, OF SAME PLACE.

MACHINE FOR BORING HOLES IN CHAIR-LEGS.

SPECIFICATION forming part of Letters Patent No. 250,167, dated November 29, 1881.

Application filed July 22, 1881. (No model.)

*To all whom it may concern:*

Be it known that I, FRANK F. PARKER, of Gardner, in the county of Worcester and Commonwealth of Massachusetts, have invented a new and useful Machine for Boring Holes in Chair-Legs; and I do hereby declare that the following is a full, clear, and exact description of the same, reference being had to the accompanying drawings, forming a part of this specification, and in which—

Figure 1 represents a top or plan view of my aforesaid chair-leg-boring machine, with some of the minor parts left off and shown separately in other figures for the purpose of convenience in illustrating the same, also with a portion of the main driving-pulleys broken away, so as to show said view upon as large a scale as possible. Fig. 2 represents a side view of the parts shown in Fig. 1, looking in the direction indicated by arrow 1' of the same figure. Fig. 3 represents a vertical central longitudinal section through the machine, taken on line A B, Fig. 1, looking in the direction of arrow 1', same figure, showing, in addition to what is shown in Fig. 1, the parts which hold the chair-legs while the holes are being bored in the same, as will be hereinafter more fully described. Fig. 4 represents a vertical transverse section through the machine, taken on line C D, Fig. 1, looking in the direction shown by arrow 2', same figure, 1, showing in this figure a portion of the belts which operate the boring-bits of the machine. Figs. 5, 6, 7, 8, and 9 represent details of different parts of the machine, which will be hereinafter more fully described, the two last-named figures, 8 and 9, being upon an enlarged scale.

The present method of boring the holes in chair-legs for the reception of the rounds or cross-pieces of the chairs is to hold the same by hand under an upright boring-machine, suitable guides or gages being used, so that they may all be bored alike. This process is not only slow and laborious, but produces less favorable results than it is desirable to obtain, it being impossible to bore all the holes perfectly true without unnecessary waste of time, especially when they are required to be bored upon an angle.

The object of my aforesaid machine is to obviate the difficulties hereinbefore enumerated— viz., to economize in time and labor, and to produce much more satisfactory results, thereby enabling the manufacturer to put upon the market a more perfectly made chair at a considerable reduction in expense.

The nature of my invention consists in arranging wheels upon one end of the machine, provided, at short distances entirely around their peripheries, with holding-fingers and sprockets for supporting and holding the chair-legs horizontally and at right angles to the sides of the machine; also, in the arrangement of four boring-bits, and the construction and arrangement of the several parts which turn and operate said bits back and forth, and also in the combination of mechanism employed for alternately turning and stopping the chair-leg-holding wheels, whereby two holes are formed in the chair-leg upon one angle by the two upper bits and the other two holes upon a different angle by the lower bits as the legs are stopped opposite and upon a line with said bits in their rotary motion, as will be hereinafter more fully set forth.

To enable those skilled in the art to which my invention belongs to make and use the same, I will proceed to describe it more in detail.

In the drawings, E represents the bed of the machine, which in this instance is extended up to form the frame-work F and ways G H of the machine, all being made in one casting, and the bed E made hollow or in shell form, as shown in Fig. 3.

Both sides of the machine, on each side of the center line A B, are constructed, arranged, and operate precisely alike, with the exception of the addition upon one side of a notched wheel, and other parts which operate in connection with the same, for alternately turning and stopping the wheels upon which the chair-legs are supported, so that the bits may bore the holes in the same, as will be hereinafter more fully described.

The boring-bits I, which are four in number and arranged in the form of a quadrangle, are secured in the ends of horizontal shafts J, arranged lengthwise of the machine. Said shafts J are fitted to turn in suitable bearings, J', in the upper and lower ends of adjustable swinging parts K K, (see Fig. 4,) which are pivoted at the center upon supporting-rods L L, the ends of which are secured in outwardly-projecting frame-pieces M M. Said frame-pieces M M are formed on bearing-hubs G' H', which connect one frame-piece with the other, and (being fitted over the ways G H, as represented in Figs. 3 and 4, so that they may slide back and forth, as hereinafter described) act as a carriage for supporting the parts upon which the boring-bits are arranged. For the purpose of convenience in construction, the parts M M G' H' are made in two sections, being divided in the center, as is also shown in Figs. 3 and 4, and said sections are secured together against the sides of ways G H by means of bolts $a\,a$, which are passed through flanges $c\,c\,c\,c$ and fastened by nuts $d\,d$, said flanges being formed at each end of the parts G' H', upon the upper side of the parts G' and under side of parts H'. Between the upper side of way G and under side of parts G' is fitted a gib, $e$, for taking up the wear caused by long usage, adjusting-screws $f$ being provided, which may be turned down in flanges $c\,c\,c\,c$, so as to bear upon the top of said gib.

The sliding parts before described are moved back and forth, so as to bore the holes in the chair-legs and withdraw the bits as each succeeding set of holes are completed, by means of an eccentric, N, secured upon the main driving-shaft O and connecting-rod P, which is connected at one end to the eccentric-strap N' of eccentric N, and at the other end hinged upon a bolt, $g$, which is passed through ears $h\,h$, formed on the sliding parts M M.

Connecting-rod P is constructed so that it may be lengthened or shortened in the following manner, (see Fig. 3:) A spindle, $k$, having a turning-nut, $l$, at its center, and provided at one side of said nut with right-hand threads and at the other side with left-hand threads, is turned into the ends $m\,m$ of said connecting-rod, and is, after the proper length is obtained, secured by set or locking nuts $n\,n$, thereby allowing of considerable adjustment in the forward-and-backward movement of the sliding parts. The bits I may also be adjusted longitudinally independently of the aforesaid adjustment by turning end spindles, $o$, in or out in the bearings J', the ends of shafts J, in which the bits are fastened, being arranged to bear against the ends of said spindles, as represented by dotted lines in the drawings. The bits are held in the heads $p$ of shafts J by means of set-screws $q$.

The main driving-shaft O, which is arranged to turn in suitable bearings, O' O', in the ends of arms F' F' of frame F, is turned by means of large pulleys Q Q, secured to the outer ends of said shaft, said pulleys Q Q being in turn driven by endless belts connected with any suitable and convenient driving mechanism above or below the machine.

The shafts J, upon which the bits are secured, are turned by means of pulleys $J^2$, which are centrally secured upon said shaft. In order that sufficient frictional surface may be obtained upon pulley $J^2$ to properly drive them with a single belt upon each side of the machine, extra guide or carrying pulleys R R are secured upon shafts S S, which are arranged to turn in the ends of frame-pieces M M, thus enabling the belts T T to be passed around the inner sides of pulleys $J^2$ and in front of pulleys R, as is fully shown in Fig. 4 of the drawings, thereby obtaining a frictional surface of more than one-half the circumference of pulleys $J^2$.

The adjustable swinging parts K K may be adjusted or swung around into different positions, as represented by dotted lines K' and full lines in Fig. 4, to bore the holes at different places in the chair-legs. The adjustment is necessary in order to bore the holes for both the right and left hand legs of chairs. When it is desired to bore the holes for the right-hand legs the upper bits are swung apart and the lower ones toward each other, and vice versa for left-hand legs. The parts K K are secured after adjustment by means of holding or set screws $K^2$. (See Fig. 4.)

To facilitate the operation of setting the bits for right or left hand legs, in practice the shafts L L are recessed a trifle at the proper points, for the pointed ends $s$ of set-screw $K^2$ to catch and hold in the same when turned in toward the shafts after adjustment.

In Figs. 1, 2, and 3 the parts K are both shown in vertical positions, as represented upon the right-hand side of Fig. 4, for convenience in illustrating the same.

The chair-legs are held in a firm and proper position, so that the bits will bore the holes at the proper point and angle in the same in the following manner: Two wheels, U U, are secured at a short distance from either side of the center of the machine upon a horizontal shaft, V, and upon the outer sides of said wheels, near the edge, are secured, by means of bolts $t$, sprockets W, (see Figs. 3, 7, and 8,) which extend a short distance beyond the peripheries of said wheels, and are made V-shaped at their outer ends (see Figs. 7 and 8) to receive the chair-legs X, shown by full and dotted lines in said Figs. 3, 7, and 8. In practice thirteen of these sprockets are used upon wheels U, as is shown in Fig. 3 of the drawings, all of the other working parts of the machine being made to conform to this number. If preferred, any other suitable number may be employed by changing the movements of other parts of the machine to correspond therewith.

Slots $u$ are formed in the wheels U, and raised ribs $v$ upon the under sides of the sprockets, (see Figs. 7, 8, and 9,) so that when said sprockets are secured upon the wheels, as represented at W in Fig. 7, they are rigidly held in position. In Figs. 1 and 6 the wheels only are shown, the position of the sprockets being indicated by dotted lines W'. The aforesaid sprockets W simply act as supports, and to resist the end pressure of the bits upon the chair-legs in the operation of boring. Said legs are held against the ends of the sprockets by means of curved holding-spring fingers $w$, (see Fig. 3,) which are secured at the points $x$ upon the periphery of another broader-faced wheel, Y, which is secured at the center of the machine, also upon shaft V and equidistant from the wheels U U. The spring-fingers $w$ are so curved as to enable the attendant to easily place the chair-legs under them, as shown in Fig. 3, and remove them after they have been bored, as hereinafter described. They are compressed so as to hold the chair-legs more firmly while the holes are being bored therein by their ends bearing against the stationary circular part $y$ of frame F. They are compressed from the time they pass under the rectangular-shaped frame Z at $z$ until they pass by the point $z'$ of said frame, when they then spring out and loosen their hold upon the chair-legs, as represented by dotted and full lines $z^2 z^3$. The circular surface $y$ is continued from the frame F to frame Z at the top and bottom by means of plates $z^4 z^4$, secured to said parts, all of which are fully represented in Fig. 3.

The shaft V, upon which the aforesaid wheels are secured, is fitted to turn in suitable bearings in the sides of frame Z, and is operated so as to alternately turn and stop to bore the holes in each succeeding chair-leg in the following manner: A wheel, V', provided in this instance with thirteen notches, 10, (see Figs. 2 and 6,) is secured upon shaft V, close up to the side Z' of frame Z, which is turned by the forward movement of a swinging dog, 11, which catches into one of the notches 10 of the wheel, a finger or projection, 12, being secured or formed on the front end of said dog 11, which catches into the notch as said dog is moved forward. A spring, 13, is arranged upon the pivot-screw 14 of the dog to insure its entering the notch. The wheel is held for the bits to bore the holes in the chair-legs by another dog or pawl, 15, which is also provided with a projecting part, 16, for catching into the notches, and a spiral spring, 17, upon its pivot-screw 18, for forcing the projecting part or pin 16 into the notches. The outer end of pawl 15 is curved down, as represented in Fig. 2, so that as the pawl or dog 11 moves forward its part 12 will force the end of said pawl down and its holding-pin 16 out of the notch. By the continued forward movement of dog 11 its projecting part 12 then enters the notch from which pin 16 has been forced out, and moves the wheel forward the distance between the notch and the next succeeding one. It then moves back again, when pin 16 is forced into the next notch by its spring 17, as before explained. The pivot-screw 14 of dog 11 is secured in a collar, 19, on connecting-rod 20, while the pivot-screw 18 of dog or pawl 15 is secured in a bearing-piece, 21, fastened to frame Z. Said piece 21 not only acts as a support for dog or pawl 15, but as a guide and bearing for the forward end of connecting-rod 20 to slide upon in its movements back and forth, as shown in Fig. 1. Connecting-rod 20 and its pawl or dog 11 are moved forward and back, as before described, by connection with the under side of the eccentric-strap N' of eccentric N, secured upon shaft O, said connection being made in this instance through a crank-lever, 22, shaft 23, crank-lever 24, and connecting-rod or link-piece 25. Said link-piece is hinged to the under side of the eccentric-strap and to the outer end of crank-lever 24. Crank-levers 22 and 24 are rigidly secured upon shaft 23, and the end of connecting-rod 20 is hinged to the upper end of crank-lever 22, as is fully represented in Fig. 2. Shaft 23 is fitted to turn in suitable bearings, 26 26, (see Figs. 3 and 5,) secured to the end of bed E. The section shown by Fig. 5 is taken on line $E^2 F^2$, looking down, as represented by arrow 3' of said figure. The dog or pawl 11 may be adjusted forward or back by turning set-nuts 27 and 28 on the threaded part 29 of connecting-rod 20 and moving collar 19, which may be made without threads upon its inner face, the same being held firmly by the nuts when turned up against it, as shown in Figs. 1 and 2. Said pawl 11 may also be adjusted by changing the radial position of crank-levers 22 and 24 on shaft 23.

Frame Z and the parts which support the chair-legs may be adjusted up or down, so as to bring the chair-legs upon a proper line with the boring-bits I, by turning screw-spindles 30 30 in or out in the ends 31 31 of frame F, short spindles 32 32 being formed at the center on frame Z, which bear against the ends of screw-spindles 30 30. They may also be turned in either direction, so as to bore the holes upon different angles, as follows: Upon frame Z, at the points 33, (see Figs. 1, 2, and 3,) is secured a circular frame-piece, 34, which may be fastened and unfastened at its center, to and from frame F, by means of a set-screw, 35, which works in a slot, 36, formed in said circular part 34. Therefore by unloosening set-screw 35 the chair-legs may be adjusted into the desired position and then fastened in that position by turning up the screw again. As the holes are bored in the chair-legs and carried along by the turning of their supporting and holding wheels, as before described, they are automatically discharged from said wheels by means of projecting arms 37 38, which are secured to the sides of frame Z.

The purpose of Fig. 6 is simply to show the form of frame Z and the positions of wheels U U, Y, and V', the sprockets W being left off of wheels U, and fingers $w$ off of wheel Y.

Fig. 7 represents a section on line $G^2 H^2$ of Fig. 6, looking in the direction indicated by arrow 5 of said figure, showing one of the sprockets W secured upon the same.

The pin 39, secured in frame Z, and small turning-lever 40, which passes through the pivot-screw 18 of pawl 15, are for stopping the motion of notched wheel V' by compressing with the fingers over the pin and under the lever, so as to force the part 16 of pawl 15 out of the notch when it is desired to stop said wheel for any reason during the operation of the machine.

It will be observed by reference to Fig. 3 of the drawings that the chair-legs X are so arranged in relation to each other and the bits that the upper bits bore one set of holes, and the lower ones the other set (see dotted lines) at right angles, or nearly so, to the first set of holes, without any changing of the position of the chair-legs, excepting that due to the rotation of the supporting-wheels U U and holding-spring-arm wheel Y.

The spring-arms $w$ might be made strong enough to hold the chair-legs in position without the use of the curved surface $y$ of frame F; but I prefer the arrangement shown in the drawings, since it enables me to remove the chair-legs with great ease and expedition after they have been bored.

Having described my aforesaid chair-leg-boring machine, what I claim therein as new and of my invention, and desire to secure by Letters Patent, is—

1. The combination, with the wheels U U, provided with adjustable sprockets W, of wheel Y, provided with spring-arms $w$, for supporting the chair-legs and a boring mechanism, substantially as and for the purposes set forth.

2. The combination, with wheel Y, provided with spring-arms $w$, of curved spring-depressing surface $y$ of frame F, substantially as and for the purposes set forth.

3. The combination, with wheels U U, provided with sprockets W and spring-arm wheel Y, of notched wheel V', connecting-rod 20, crank 22, and pawls 11 and 15, substantially as and for the purposes set forth.

4. The combination of sprocket-wheels U, spring-finger wheel Y, and notched wheel V', upon the shaft V, with pawl 15, lever 40, and pin 39, substantially as and for the purposes set forth.

5. The combination, with frame Z, of spindles 32 32 and adjusting-screws 30 30, slotted segment-piece 34, and adjusting-bolt 35, substantially as and for the purposes set forth.

6. The combination of wheel Y, carrying spring-fingers $w$, with the curved surface $y$ of frame F, adjustable frame Z, and the connecting spring-plates $z^4 z^4$, substantially as and for the purposes set forth.

7. The combination of sliding carriage M M G' H', for supporting the adjustable bit-shafts and their operating-pulleys, with guideways G H, wheels U U, carrying a series of adjustable sprockets, and wheel Y, provided with spring-fingers, substantially as and for the purposes set forth.

8. The combination, with rods L L, arms M M, carrying shafts S and pulleys R at their outer end, of the swinging parts K K, for supporting the bit-shafts J, carrying pulleys $J^2$, substantially as and for the purposes set forth.

9. The combination, with carriage M M G' H', carrying adjustable bit-shafts thereon, and eccentric N, with strap N' surrounding the eccentric, of the adjustable device consisting of the double screw $k$, turning-nut $l$, hub parts $m$ $m$, and locking-nuts $n$ $n$, substantially as and for the purposes set forth.

10. The combination, with carriage M M and rods L L, of swinging frames K K, adjustable bit-shafts J, and carrying-pulleys R R, substantially as and for the purposes set forth.

FRANK F. PARKER.

Witnesses:
 EDWIN E. MOORE,
 ALBERT A. BARKER.